(12) United States Patent
Fischer (10) Patent No.: US 12,155,498 B2
(45) Date of Patent: Nov. 26, 2024

(54) SYSTEM AND METHOD FOR ANNOTATING LIVE SOURCES

(71) Applicant: Brandon Fischer, Carmel, IN (US)

(72) Inventor: Brandon Fischer, Carmel, IN (US)

(*) Notice: Subject to any disclaimer, the term of this patent is extended or adjusted under 35 U.S.C. 154(b) by 0 days.

(21) Appl. No.: 18/176,077

(22) Filed: Feb. 28, 2023

(65) Prior Publication Data

US 2023/0283497 A1 Sep. 7, 2023

Related U.S. Application Data (60) Provisional application No. 63/268,951, filed on Mar. 7, 2022.

(51) Int. Cl.
| | | |
|---|---|---|
| *G06F 15/16* | (2006.01) | |
| *G06F 16/438* | (2019.01) | |
| *G06F 16/483* | (2019.01) | |
| *H04L 12/18* | (2006.01) | |
| *H04L 65/403* | (2022.01) | |

(52) U.S. Cl.
CPC ...... *H04L 12/1831* (2013.01); *G06F 16/4393* (2019.01); *G06F 16/483* (2019.01); *H04L 65/403* (2013.01)

(58) Field of Classification Search
CPC ............ H04L 12/1831; H04L 65/403; G06F 16/4393; G06F 16/483
See application file for complete search history.

(56) References Cited

U.S. PATENT DOCUMENTS

| | | | |
|---|---|---|---|
| 8,095,796 B2* | 1/2012 | Conwell | G06F 16/634 |
| | | | 713/161 |
| 2012/0042274 A1* | 2/2012 | Guyon | G06Q 10/101 |
| | | | 715/780 |
| 2013/0325970 A1* | 12/2013 | Roberts | H04N 21/854 |
| | | | 709/227 |
| 2018/0376104 A1* | 12/2018 | Li | H04N 7/147 |
| 2020/0394012 A1* | 12/2020 | Wright, Jr. | G06F 3/011 |
| 2022/0374585 A1* | 11/2022 | Wang | G11B 27/031 |
| 2023/0007064 A1* | 1/2023 | Yang | G06F 3/04812 |

* cited by examiner

*Primary Examiner* — Duyen M Doan
(74) *Attorney, Agent, or Firm* — Ice Miller LLP; Safet Metjahic (57) ABSTRACT

A communication system and a computer-implemented method for recording and retaining live share AV content and annotations, comprising: a system and method for provide one or more live AV content feeds to one or more computing devices as a live share, wherein the parties involved in the live share can annotate the live AV content in real-time; recording the annotations in real-time in a synchronized temporal and spatial state, such that when the live share AV content is played back, the annotations are reproducible exactly as when originally made to the AV content during the original live share, including at the same points in time and location as in the original live share experience. The communication system can be arranged to capture and retain information about each live share participant that contributed to an annotation.

20 Claims, 4 Drawing Sheets

SYSTEM AND METHOD FOR ANNOTATING LIVE SOURCES

CROSS REFERENCE TO PRIOR APPLICATION

This application claims priority to, and the benefit thereof, provisional U.S. Patent Application Ser. No. 63/268,951, filed on Mar. 7, 2022, titled "System and Method for Annotating Live Sources," the entirety of which is hereby incorporated by reference and fully set forth herein.

FIELD OF THE DISCLOSURE

The present disclosure relates to a communication system and computer-implemented method for providing a live video screenshare to multiple computing devices in a live share session, and, more particularly, to a communication system and computer-implemented method for providing each computing device with a capability of annotating the live screenshare such that the live screenshare and any annotations are maintained in a synchronized temporal state.

BACKGROUND OF THE DISCLOSURE

In a computer networked environment such as the Internet, videoconferencing is commonly used for the reception and transmission of audio-video (AV) content by users in different locations, for communication between people in real-time. Videoconferencing systems such as, for example, ZOOM, Microsoft TEAMS, and Webex are commonly used to facilitate AV content exchange amongst multiple users. While such videoconferencing systems can provide users with an ability to live share AV content, such systems do not provide a real-world experience since users are unable to annotate the live share AV content in real-time such that the live share and annotations can be stored or played back in a synchronized temporal state.

There exists an unfulfilled need for a communication solution that can provide a live video feed to multiple computing devices as a live screenshare, and that can provide each computing device with a capability of annotating the live screenshare such that the live screenshare and any annotations are maintained in a synchronized temporal state.

SUMMARY OF THE DISCLOSURE

The present disclosure provides a communication solution for providing a live video feed to multiple computing devices as a live screenshare, and, in various nonlimiting embodiments, a communication system and computer-implemented method for providing each computing device with a capability of annotating the live screenshare such that the live share and any annotations are maintained in a synchronized temporal state.

In embodiments of the disclosure, a communication system and computer-implemented are constructed to provide one or more live AV content feeds to one or more computing devices as a live AV content feed share, wherein the parties involved in the live share can annotate the live AV content in real-time. The communication system and computer-implemented method can be configured to record and retain annotations made in the live share in a synchronized temporal and spatial state with respect to the AV content that was annotated. The communication system and computer-implemented method can be arranged to record and retain the annotations as they appear in the live share in real-time, such that if the AV content were to be played back, the annotations would be rendered and appear exactly as they appeared during the original live share, including at the same points in time and location as in the original live share experience. The communication system can be arranged to capture and retain information about each live share participant that contributed to an annotation.

In an embodiment of the disclosure, a communication system is provided for initiating and supplying a live share containing live audio-video content from one or more computer resource assets. The system comprises: a receiver configured to receive a live audio-video content feed from a computer resource asset; and a processor communicatively coupled to the receiver The processor can be configured to: initiate, by a live share creator and in response to an instruction signal from a participant computing device, a live share session that includes the live audio-video content feed from the computer resource asset; annotate, by a live share recorder and in response to an annotation instruction signal received from the participant computing device or another participant computing device, audio-video content in the live audio-video content feed to generate an annotation or annotated audio-video content; and store, by the live share recorder, the annotation or the annotated audio-video content in a memory; and a transmitter communicatively coupled to the processor, the transmitter being configured to send the annotated audio-video content to at least one of the participant computing device and said another participant computing device to render a live share comprising the live audio-video content feed, including the annotated audio-video content, wherein the annotation is generated in temporal and spatial synchronization with the annotated audio-video content.

The communication system can further comprise: a fingerprint unit configured to generate a digital fingerprint of the audio-video content; or an annotation encoder configured to encode the audio-video content with the digital fingerprint to generate the annotated audio-video content; or a live share player configured to generate live share display rendering instructions and live share display rendering data for the live share rendered by said at least one of the participant computing device and said another participant computing device, the live share comprising the live audio-video content feed and the annotated audio-video content.

In the communication system, the live share player can comprise a content match unit, the content match unit being configured to: analyze audio-video content and compare the analyzed audio-video content to annotated audio-video content; and determine when the analyzed audio-video content matches the annotated audio-video content.

In the communication system, the live share player can be configured to: retrieve the annotation from memory that corresponds in temporal and spatial synchronization to the matching audio-video content; and apply the retrieved annotation to the matching audio-video content.

In the communication system, the content match unit can be configured to: analyze audio-video content by generating a digital fingerprint of the audio-video content; and compare the analyzed audio-video content to annotated audio-video content by comparing the digital fingerprint to a digital fingerprint of the annotated audio-video content.

In an embodiment of the disclosure, a computer-implemented method is provided for initiating and supplying a live share containing live audio-video content from one or more computer resource assets. The method comprises: receiving a live audio-video content feed from a computer resource asset; initiating, by a live share creator and in response to an instruction signal from a participant computing device, a live share session that includes the live audio-video content feed from the computer resource asset; annotating, by a live share recorder and in response to an annotation instruction signal received from the participant computing device or another participant computing device, audio-video content in the live audio-video content feed to generate an annotation or annotated audio-video content; storing, by a memory, the annotation or the annotated audio-video content; and transmitting the annotated audio-video content to at least one of the participant computing device and said another participant computing device to render a live share comprising the live audio-video content feed, including the annotated audio-video content, wherein the annotation is generated in temporal and spatial synchronization with the annotated audio-video content.

The computer-implemented method can further comprise: generating, by a fingerprint unit, a digital fingerprint of the audio-video content; or encoding the audio-video content with the digital fingerprint to generate the annotated audio-video content; or generating live share display rendering instructions and live share display rendering data for the live share rendered by said at least one of the participant computing device and said another participant computing device, the live share comprising the live audio-video content feed and the annotated audio-video content; or analyzing audio-video content, comparing the analyzed audio-video content to annotated audio-video content, and determining when the analyzed audio-video content matches the annotated audio-video content; or retrieving the annotation from memory that corresponds in temporal and spatial synchronization to the matching audio-video content, and applying the retrieved annotation to the matching audio-video content.

In the computer-implemented method: the analyzing the audio-video content includes generating a digital fingerprint of the audio-video content; and the comparing the analyzed audio-video content to annotated audio-video content includes comparing the digital fingerprint to a digital fingerprint of the annotated audio-video content.

In an embodiment of the disclosure, a non-transitory computer-readable medium is provided for initiating and supplying a live share containing live audio-video content from one or more computer resource assets, the computer-readable medium comprising instructions that, when executed by a processor, cause the processor to perform a method comprising: receiving a live audio-video content feed from a computer resource asset; initiating, by a live share creator and in response to an instruction signal from a participant computing device, a live share session that includes the live audio-video content feed from the computer resource asset; annotating, by a live share recorder and in response to an annotation instruction signal received from the participant computing device or another participant computing device, audio-video content in the live audio-video content feed to generate an annotation or annotated audio-video content; storing, by a memory, the annotation or the annotated audio-video content; and transmitting the annotated audio-video content to at least one of the participant computing device and said another participant computing device to render a live share comprising the live audio-video content feed, including the annotated audio-video content, wherein the annotation is generated in temporal and spatial synchronization with the annotated audio-video content.

In the non-transitory computer-readable medium, the method can further comprise: generating, by a fingerprint unit, a digital fingerprint of the audio-video content; or encoding the audio-video content with the digital fingerprint to generate the annotated audio-video content; or generating live share display rendering instructions and live share display rendering data for the live share rendered by said at least one of the participant computing device and said another participant computing device, the live share comprising the live audio-video content feed and the annotated audio-video content; or analyzing audio-video content, comparing the analyzed audio-video content to annotated audio-video content, and determining when the analyzed audio-video content matches the annotated audio-video content; or retrieving the annotation from memory that corresponds in temporal and spatial synchronization to the matching audio-video content, and applying the retrieved annotation to the matching audio-video content.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

The present disclosure is further described in the detailed description that follows.

DETAILED DESCRIPTION OF THE DISCLOSURE

The disclosure and its various features and advantageous details are explained more fully with reference to the nonlimiting embodiments and examples that are described or illustrated in the accompanying drawings and detailed in the following description. It is noted that features illustrated in the drawings are not necessarily drawn to scale, and features of one embodiment can be employed with other embodiments as those skilled in the art will recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

In state-of-the-art videoconference systems, when a live video feed is shared between two or more computing devices as a live screenshare, the parties involved in the live screenshare are unable to annotate (such as, for example, draw on, markup, or modify) live audio-video content in a manner that retains the AV content and annotation in a synchronized temporal state. In other words, if the AV content were to be played back, any annotations would not appear as in the original live share experience. In state-of-the art videoconference system, this is currently an unsolved challenge—there is no way to save live annotations made upon a live AV content share for future playback. Instead, a participant has to take screenshot stills of their display screen, or record the display screen using an external device such as a video camera in order to be able to save the annotations with the AV content.

Figure 4:
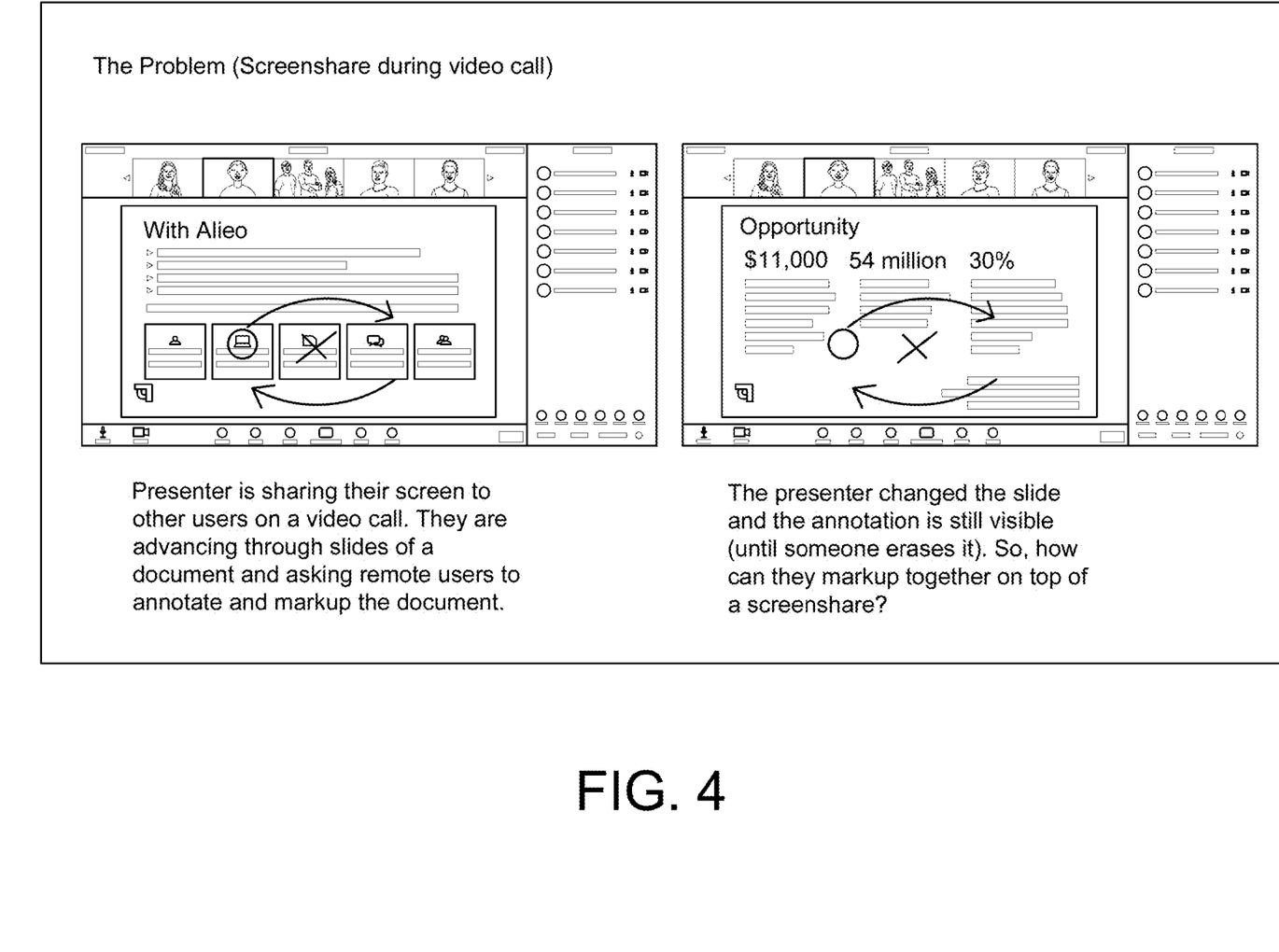
FIG. 4 shows an example of a problem with state-of-the art live screenshare systems.

FIG. 4 depicts an example of this problem in the state-of-the art live screenshare systems. As seen in the screenshare on the left in FIG. 4, a user in a live share session has drawn on top of the screenshare. However, when the screenshare changes and new AV content (for example, new scene or camera angle) is displayed on the screenshare, the drawing remains and continues to display on top of the new screenshare, necessitating erasure. Currently, it is necessary for someone to take screenshots of each marked-up slide, which tends to be very cumbersome, or someone marks it up based on the verbal feedback from others. The instant disclosure solves this and other problems.

In various embodiments, a communication system is provided that can provide one or more live AV content feeds to one or more computing devices as a live screenshare in live share session. The communication system is configured to allow a party involved in the screenshare to, using their computing device, annotate the live AV content in real-time. The communication system can record and retain the annotations in a synchronized temporal state with the live screenshare, such that if the AV content were to be played back, the annotations would appear exactly as they appeared during the original live share session, including at the same points in time and locations on a display screen as in the original live share experience. The communication system can be arranged to capture and retain information about the live share participant that made the annotation to the screenshare.

In an embodiment, the communication system can be arranged to generate an AV content fingerprint and annotation instructions and data for each annotation. The AV content fingerprint and annotation instructions and data can be stored in an annotation rendering file. The annotation instructions can include, for example, computer-executable annotation instructions and annotation data. The annotation vector can include, for example, Hyper Text Markup Language (HTML), Cascading Style Sheets (CSS) and scripting languages such as, for example, JavaScript. The HTML code can include, for example, HTML 2, HTML 3, HTML 5, XHTML or any variation of HTML.

The annotation instructions can include computer-executable instructions (code) comprising annotation rendering instructions that, when executed by a processor, cause the processor to reproduce and display the annotation exactly as it appeared in the original live share, in a synchronized temporal and spatial state with the AV content that was originally annotated during the screenshare. The processor can cause reproduction or display by, for example, driving and controlling computer resource assets such as, for example, audio and video drivers, speakers, and video displays. That original AV content can be processed by, for example, a fingerprinting algorithm in the communication system to generate a unique AV content fingerprint.

The AV content fingerprint can include a video fingerprint, an acoustic fingerprint, a canvas fingerprint, or a device fingerprint. In an embodiment, the AV content fingerprint includes, for example, a hash value, a hash code, a digest, a hash, or a perceptual hash. The AV content fingerprint can be generated, for example, using a digital video fingerprinting (for example, a hashing algorithm or a perceptual hashing algorithm), an acoustic fingerprinting algorithm, a browser fingerprinting algorithm, or a machine fingerprinting algorithm. The AV content fingerprint can be generated based on a live AV content feed (or live screenshare) sampled on a frame-by-frame basis for each image (or sound) frame, which can be on the order of seconds for AV content, such as, for example, still photos, or $\frac{1}{30}$ of a second, or $\frac{1}{60}$ of a second (i.e., every 0.033 or 0.0167 seconds) for AV content, such as, moving or streaming video. In certain embodiments, the sampling rate can be greater than $\frac{1}{60}$ of a second, or less than $\frac{1}{30}$ of a second, depending on the application.

In at least one embodiment, the AV content fingerprint can include one or more hashes generated by a hash function, including, for example, a video hash, an audio hash, a browser hash, a machine hash, or a hash comprising any combination of the foregoing.

The annotation data can include, for example, an identification of the participant that made the annotation (UserID), time (t) of each unique annotation, screen location (AL) of each unique annotation, an AV content fingerprint, and any other data necessary to reproduce the annotation in the synchronized temporal and spatial state with respect to the AV content, exactly as in the original live share experience.

The UserID can include, for example, the participant's name, login identification (ID), username, telephone number, address, IP address, MAC address, or any other identifier that can uniquely identify a participant or the participant's computing device.

The time t can include one or more timestamps, each of which can correspond to the time at which an annotation is made to the AV content during the live screenshare. The time t can include the actual time at which the annotation is made. The time t can include a duration of time (for example, in seconds, or fractions thereof) during which the annotation was kept on the screenshare during the live share. For example, the time duration can begin at time t0 when the annotation is initially made and end at time tn when annotated AV content ends or changes substantially, or when the annotation is modified or removed, where n is a non-zero positive integer.

In an embodiment, for each pixel location of the annotation (or group of pixel locations) on the screenshare, the time t can include the discrete time at which that pixel (or group of pixels) of was annotated, such that, for example, the annotation can be rendered at a later exactly as it was rendered in the original live share experience. The pixel location can be the pixel location(s) of the actual AV content in the screenshare, so that as the AV content moves across the display of a computing device, the annotation maintains constant spatial association with the underlying AV content, and moves in synchronism with the underlying AV content.

The screen location AL can include, for example, the location of each pixel on the display screen used for the annotation. For instance, the screen location AL can include an x-coordinate and a y-coordinate (in the Cartesian system), or a row (r) and column (c) of each screen pixel used for the annotation.

The annotation rendering instructions can include, for example, unique commands (for example, HTML, CSS or JavaScript commands) that, when executed by a processor, cause the processor to drive and control the pixels on a display device, or drive an audio device (for example, speaker), to reproduce the annotation exactly as it appeared in the original live screenshare session. The annotation rendering instructions can cause the processor to use annotation data, including AV content fingerprints, participant information (UserID), pixel location information (AL), or time information (t), when reproducing the annotation on a display screen or audio output device. The annotation rendering instructions can include commands for reproducing each pixel or sound according to a predetermined rule, including, for example, color, hue, saturation, intensity, pixel density, resolution, pixel address, amplitude, pitch, and timbre.

In an embodiment, the annotation rendering instructions can be linked to a particular article, object, or portion of an image, scene, or sound that may appear in one or more image or sound frames, such as, for example, in a still video image or a moving live video, such as, for example, in a live sporting match such as a Football game. The annotation rendering instructions can be stored, by the communication system, in real-time as each annotation is made, for example, by a participant, to a live AV content feed in a screenshare.

In an embodiment, the annotation rendering instructions can be linked to the portion of the AV content that is originally annotated, such that a persistent annotation is created and retained in temporal and spatial synchronization with the underlying AV content. In an example, a screenshare can include a live AV content feed of a Football game. In the example, a screenshare participant can draw a circle around a player in the live AV content feed, in real-time during a live share, and the drawn circle will remain exactly as drawn on that player, and will move with the player as the player moves in the Football game in the live AV content feed. So, if the camera angle in the live AV content feed is such that the player moves left and out of the field of view, the annotation also moves left and out of the field of view, in temporal and spatial synchronization with the player. Then, when the player moves right and into the field of view, the annotation also moves with the player to the right and into the field of view. The communication system can be configured to allow participants to annotate live AV content as it appears in real-time and have each annotation linked to the annotated AV content such that it remains temporally and spatially synchronized with the underlying (or annotated) AV content.

In another example, the screenshare can include a virtual classroom that includes a live AV content feed of a document (for example, originating from a teacher's computing device) that extends beyond the field of view in the feed in the screenshare. In the example, a student participant at a student computing device can circle certain text in the document using a pointer device, such as, for example, a mouse, a stylus, or the user's finger on touchscreen. Then, when the teacher scrolls up in the document such that the text moves up and out of the field of view, the circle drawn by the student moves in synch with the text, up and out of the field of view. When the teacher scrolls down and the text reappears in the field of view, the circle also reappears and moves in synch with the text, exactly as drawn, in temporal and spatial synchronization.

In various embodiments, the communication system and computer-implemented method can be configured to store annotation rendering files without storing the corresponding AV content. In an embodiment, the AV content can be stored and the annotation rendering files can be indexed to the stored AV content.

In an embodiment, as a screenshare user annotates a live AV content feed, the communication system can fingerprint the individual frames of the live AV content and store the AV content fingerprint together with the annotation rendering instructions and data, for example, as an annotation rendering file. The embodiment provides among other advantages, reduced bandwidth and storage requirements since only a small fraction of the original AV content data is actually transmitted or stored. The embodiment also provides a level of security since the AV content is obfuscated.

In an embodiment, when AV video content is played back, the communication system is configured to monitor and compare the AV content to AV content fingerprints. The AV content can be played back from a local storage, or it can be received by the communication system as an AV content feed from an external computing resource asset. When a match is determined (or predicted), the annotation rendering instructions and data can be executed to reproduce the annotation exactly as it appeared originally when it was made with respect to the underlying AV content, in temporal and spatial synchronization.

In an embodiment, the communication system can be arranged to record the time and location of each annotation instance with respect to the live AV content during the live screenshare. The communication system can be arranged to generate and record, for each instant of the annotation, an AV content fingerprint. For instance, the communication system can be configured to determine and record the time (t), the screen location (AL), and details of the annotation each time an annotation (or portion thereof) is made to live AV content during a live screenshare. In certain embodiments, the location $AL_i$ can include one location component (for example, x-coordinate value $x_i$ in the Cartesian coordinate system, where i is a positive non-zero integer), two location components (for example, $x_i$ and y-coordinate value $y_i$), or three location components (for example, $x_i$, $y_i$, and z-coordinate value $z_i$), as represented by the following:

$$AL_i = x_i \text{(one-dimension or 1D)} \quad (1)$$

$$AL_i = x_i, y_i \text{(two-dimensions or 2D)} \quad (2)$$

$$AL_i = x_i, y_i, z_i \text{(three-dimensions or 3D)} \quad (3)$$

In a nonlimiting embodiment, each location $AL_i$ can include a pixel position of a portion of an annotation made in real-time on the live AV content feed as it appears on a display screen of a participant computing device. The locations $AL_0, AL_1, AL_2, \ldots AL_i$ can correspond to display pixel positions of the live AV content feed at which the annotation is made in real-time at time $t_j$, where j is a positive non-zero integer. The locations AL can indicate the exact location of each pixel comprising an annotation applied to the AV content in real-time, such that the annotation and underlying AV content can be reproduced (or played back) exactly as the annotation appeared (or, in the case of audio content, was reproduced) as it was made to the live AV content feed during the original live share experience.

In an embodiment, the locations AL can be indexed to corresponding locations in the annotated AV content, such that the annotations and underlying AV content can be rendered or played back in temporal and spatial synchronization. For each instant of time $t_j$, the location(s) $AL_i$ of the annotation can be mapped (or indexed) to the corresponding pixel locations $VL_i$ in the frames of the underlying AV content where the annotation was made during the live share session. The live AV content feed rendered during the live screenshare can include mono-channel or multichannel audio content. An annotation can include one or more annotation portions comprising video or audio annotations made to the live AV content feed during the screenshare.

In an embodiment, a screenshare, including one or more live AV content feeds, can be stored in memory. Each stored frame of the screenshare can be encoded with a timestamp. In the embodiment, annotated AV content can be encoded with a time stamp for each instant of time $t_j$. The memory can include a first database configured to store, with the annotated AV content, the location $VL_i$ in the underlying AV content for each instant of time $t_j$ at which the annotation (or portion thereof) was made originally to the AV content during the original live screenshare. In this embodiment, for each instant of time $t_j$, information about the annotation and the location $AL_i$ for each portion of the annotation can be stored and contained in, for example, an annotation rendering file in the memory, such as, for example, in a second database. The memory can include one or more relational databases. The annotation rendering file can include information necessary to reproduce the annotation exactly as it was originally made to the underlying AV content, in temporal and spatial synchronization. As noted above, the annotation rendering file can include annotation rendering instructions and annotation data, including, for example, computer-executable commands, the annotation location(s) AL, and time t, such that the annotation can be rendered and mapped exactly to the corresponding underlying AV content.

In an embodiment, the communication system and computer-implemented method can be arranged to receive annotation instructions from a participant computing device, and to annotate in real-time one or more live AV content feeds, in temporal and spatial synchronization. The communication system and computer-implemented method can be configured to store and retain live screenshare AV content, including annotations exactly as they appeared during the original live share, without needing to take screenshots or use external tools to record the live share. For example, a screenshare participant can, at a first computer resource asset (for example, computing device 10, shown in FIG. 1), observe a live AV content feed originating from a second computing resource asset (for example, another computing device 10, or computer resource assets 50 or 60, shown in FIG. 1) and annotate the live AV content feed in real-time on that computing device 10. In an embodiment, the annotations applied to the live AV content feed can be rendered on the computing devices 10 of all (or some) of the participants in the screenshare. The communication system and computer-implemented method can be arranged to encode the annotations as they occur in real-time into, or in temporal and spatial synchronization with, the live AV content feed, such that, for example, when the screenshare is played back (or reproduced), the annotations appear exactly as they had during the original live share experience—for example, lines drawn on a live AV content feed by a participant during a live screenshare appear, when played back, exactly as they were drawn during the original live share. In an embodiment, each annotation pixel location and its characteristics as it appeared in real-time in each frame of live share AV content can be encoded and stored in memory for future playback, as part of the live share AV content.

Figure 1:
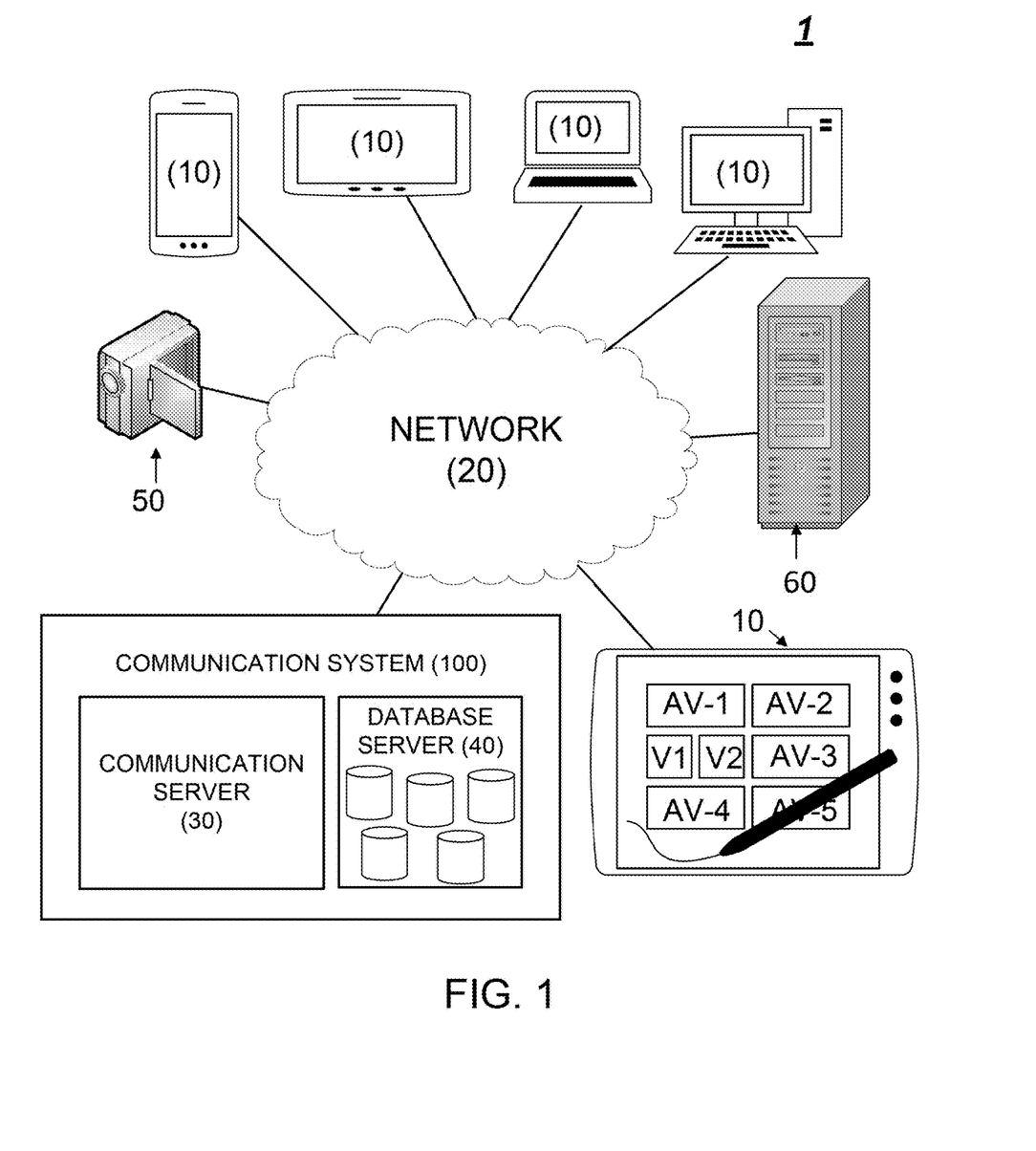
FIG. 1 depicts an implementation of a communication system in a user environment, arranged according to the principles of the disclosure.

FIG. 1 is a block diagram depicting an implementation of an embodiment of a communication system 100 in an environment 1. The environment 1 can include, in addition to the communication system 100, a plurality of computing devices 10 and a network 20. The environment 1 can include a sound and image pickup device 50, which can include, for example, a still camera, a video camera, a smartphone camera, or any computing device capable of capturing and transmitting a still or moving image signal, as well as sound. The environment 1 can include a live AV content feed computer resource asset 60, such as, for example, a communication server of a multimedia content provider. The computer resource asset 60 can include a source of live AV content feed, such as, for example, a sporting match, a live classroom lecture, or any other content that can be displayed or reproduced by the computing device 10.

The computing device 10 can include, or it can be coupled to, an audio-video pickup device such as, for example, a high-definition video camera and microphone, to capture sound and video in proximity to the computing device 10, such as speech and images of the participant. The computing device 10 can include a communicating device such as, for example, a cellphone, a smartphone, a computer tablet, a laptop computer, a desktop computer, a workstation, or any communicating device capable of rendering one or more live AV content feeds, such as, for example, live AV content feeds AV-1, AV-2, AV-3, AV-4 or AV-5 (shown in FIG. 1), each of which can originate from the computing devices 10. The computing device 10 can be arranged to render sound and video content received from the computer resource asset 60, such as, for example, video content V1 and V2.

In various embodiments, the computer resource asset 60 can include a live AV content streaming source, such as, for example, a content delivery network, an HTTP (Hypertext Transfer Protocol) live streaming (HLS) source, a real-time messaging protocol (RTMP) source, a secure reliable transport (SRT) source, a dynamic adaptive streaming over HTTP (MPEG-DASH) source, a Microsoft smooth streaming (MSS) source, a web real-time communication (WebRTC) source, a really simple syndication (RSS) feed source, a JavaScript Objection (JSON) feed source, an Atom feed source, an hAtom feed source, a FeedSync source, a WebSub source, a Mashup source, or the like. The annotation rendering instructions and annotation rendering data can be configured to be compatible and reverse-compatible with any of the foregoing live AV content feed sources.

In embodiments of the environment 1 depicted in FIG. 1, the communication system 100 includes a communication server 30 and a database server 40. In an embodiment, the communication system 100 can include a communication device architecture, such as, for example, that depicted in FIG. 2.

In various embodiments, the communication system 100 (shown in FIG. 2), including processor 110, can be located in any (or each) of the computing devices 10. Additionally, or alternatively, the communication system 100 can be provided separately from the computing devices 10, as seen in FIG. 1.

Figure 2:
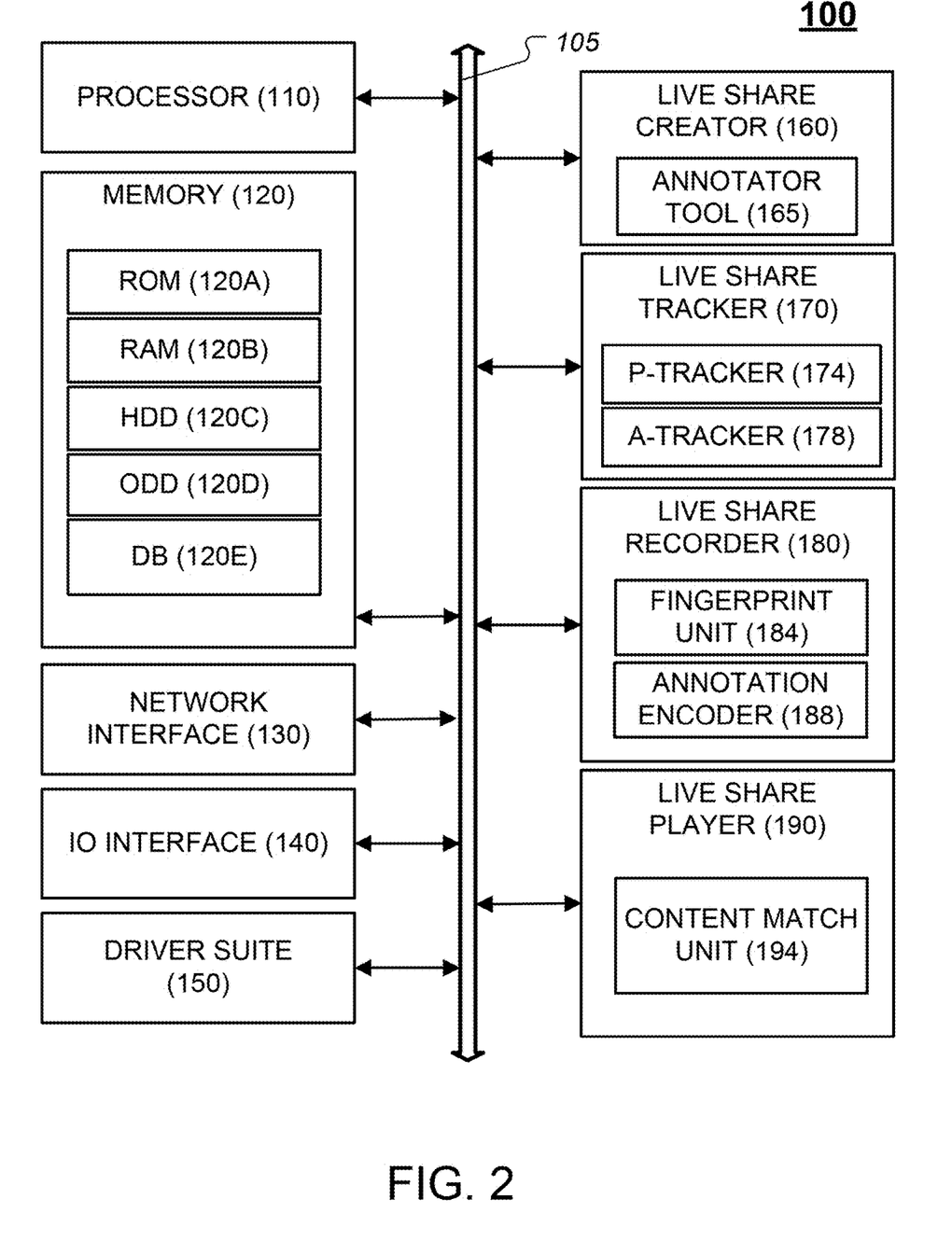
FIG. 2 depicts a nonlimiting embodiment of a communication system, constructed according to the principles of the disclosure.

FIG. 2 depicts an embodiment of the communication system 100, arranged according to the principles of the disclosure. The communication system 100 can include a plurality of computer resource assets, including a bus 105, a processor 110, a memory 120, a network interface 130, an input-output (IO) interface 140, a driver suite 150, a screenshare creator 160, an annotation tracker 170, a live share recorder 180, and a live share player 190. Any of the computer resources assets 110 to 190 can be interconnected using various buses, and can be mounted on a common motherboard or in another manner, as appropriate.

The processor 110 can be arranged to process instructions for execution within the communication system 100, including instructions stored in the memory 120. The processor 110 can be arranged to generate and send or display graphical information for a graphic user interface (GUI) on a display screen, including, for example, an external input/output computer resource asset, such as, for example, the computing device 10 (shown in FIG. 1), which can be coupled to the communication system 100 via a communication link such as, for example, over the network 20. In various implementations, multiple processors or multiple buses can be used, as appropriate, along with multiple memories and types of memory. The communication system 100 can be communicatively coupled or connected with any computer resource asset in the environment 1 (shown in FIG. 1) and arranged to provide portions of the necessary operations (for example, as a server bank, a group of blade servers, or a multi-processor system).

The processor 110 can include any of various commercially available processors. The processor 110 can include a computing device. Dual microprocessors and other multi-processor architectures can be employed as the processor 110. The processor 110 can include a central processing unit (CPU) or a graphic processing unit (GPU). The processor 110 can be arranged to interact with any of the computer resource assets in the communication system 100 to carry out or facilitate with the processes described herein.

The bus 105 can include any of several types of bus structures that can further interconnect to a memory bus (with or without a memory controller), a peripheral bus, and a local bus using any of a variety of commercially available bus architectures.

The memory 120 can include a read-only memory (ROM) 120A, a random-access memory (RAM) 120B, a hard disk drive (HDD) 120C, an optical disk drive (ODD) 120D, and a database (DB) 120E. The memory 120 can provide nonvolatile storage of data, data structures, and computer-executable instructions, and can accommodate the storage of any data in a suitable digital format. The memory 120 can include a computer-readable medium that can hold executable or interpretable computer code (or instructions) that, when executed by the processor 110, cause the steps, processes and methods in this disclosure to be carried out. The computer-readable medium can include a non-transitory computer-readable medium. The computer-readable medium can be contained in the memory 120, and can include sections of computer code that, when executed by the processor 110, cause the communication system 100 to annotate live AV content or record annotated live AV content during a live share.

A basic input-output system (BIOS) can be stored in the ROM 120A, which can include, for example, a non-volatile memory, an erasable programmable read-only memory (EPROM), or an electrically erasable programmable read-only memory (EEPROM). The BIOS can contain the basic routines that help to transfer information between any one or more of the computing resource assets in the communication system 100, such as during start-up.

The RAM 120B can include dynamic random-access memory (DRAM), a synchronous dynamic random-access memory (SDRAM), a static random-access memory (SRAM), a nonvolatile random-access memory (NVRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from or to a compact disk (CD)-ROM disk (not shown), or, read from or write to other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 120E can include one or more databases, including, for example, one or more relational databases. The DB 120E can store machine learning (ML) training datasets and ML testing datasets for building and training a machine learning (ML) model. In an embodiment, the communication system 100 can include a machine learning platform that can be configured to build a machine learning model and train the ML model to perform the operations disclosed herein. The ML model can be trained to detect and identify, in real-time, unique AV content and generate AV content fingerprints of annotated AV content, such that persistent temporal and spatial synchronization can be maintained at all times between the annotations and the underlying AV content. The ML model can be loaded, for example, into the RAM 120B, and run by the processor 110 executing computer resource processes on the ML platform. The training datasets can be updated periodically (or continuously). The ML model can be trained or tuned with updated parametric values, such as, for example, during operation of the communication system 100, or during training of the ML model with updated training datasets and testing datasets.

The memory 120 can be arranged to provide mass storage, for example, in the DB 120E. The memory 120 can include the database server storage 40 (shown in FIG. 2). The memory 120 can contain a computer-readable medium, such as a solid-state drive (SSD), a hard disk device, an optical disk device, a flash memory or other similar solid-state memory device, or an array of devices, including devices in a storage area network or other configurations.

A computer program product can be tangibly embodied in a non-transitory computer-readable medium, which can be contained in the memory 120. The computer program product can contain instructions that, when executed, perform one or more methods or operations, such as those included in this disclosure. The computer-readable medium can include an information carrier (for example, an SSD device, a flash drive, or the like) that can be communicatively coupled to (or decoupled from) the communication system, such as, for example, to/from the memory 120 or memory on the processor 110.

Any number of computer resources can be stored in the memory 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, JSON API, HTTP API, HLS API, RTMP API, SRT RPI, MPEG-DASH API, MSS API, WebRTC API, RSS API, Atom API, hAtom API, FeedSync API, WebSub API, Mashup API, or any other utility or service API. Any (or all) of the operating system, application programs, APIs, program modules, and program data can be cached in the RAM 120B as executable sections of computer code.

The API can include an API for a markup language such as, for example, SGML, SVG, HTML, XHTML/XML), XUL, or LaTeX.

The API can include an API for a style sheet language, such as, for example, CSS, DSSSL, or XSL. The API can include a web-based API, an operating system API, a database system API, a computer hardware API, or a library API. The API can include, for example, one or more of the APIs available at <<https://developers.google.com>>.

The API can include one or more APIs that connect webpages to scripts or programing languages, including modelling (for example, SGML, SVG, HTML, XHTML/XML, XUL) documents as objects.

The API can include a document object model (DOM) API, such as for HTML or XML (for example, DOM5 HTML), that can create object-oriented representations of AV content that can be modified with a scripting module (not shown). A DOM can include a cross-platform and language-independent convention for representing and interacting with objects in HTML, XHTML/XML, SGML, SVG, or XUL.

The network interface 130 can be connected to the network 20 (shown in FIG. 1), which can include the Internet. The network interface 130 can include a wired or a wireless communication network interface (not shown) or a modem (not shown). When used in a local area network (LAN), the communication system 100 can be connected to the LAN network through the wired or wireless communication network interface; and, when used in a wide area network (WAN), the communication system 100 can be connected to the WAN network through the modem. The modem (not shown) can be internal or external and wired or wireless. The modem can be connected to the system bus 105 via, for example, a serial port interface (not shown). The network interface 130 can include a receiver (not shown), a transmitter (not shown) or a transceiver (not shown).

In various embodiments, the transceiver (transmitter and receiver) can be communicatively coupled to the computer resource assets in the communication system 100, including, for example, the bus 105, the processor 110, the screenshare creator 160, and the live share player 190. The transceiver can be configured to communicate and interact with the screenshare creator 160 to receive live AV content feeds from computer resource assets in the environment 1 (shown in FIG. 1), such as, for example, the computer resource assets 10, 50, and 60 (shown in FIG. 1). The transceiver can be configured to communicate and interact with the screenshare creator 160 to generate a screenshare (including any live AV content feeds and annotations), packetize the screenshare, and transmit the screenshare to any of the participating computing devices 10.

In at least one embodiment, the transceiver can be configured to communicate and interact with the live share player 190 to generate a screenshare (including any live AV content feeds and annotations), packetize the screenshare, and transmit the screenshare to any of the participating computing devices 10.

In various embodiments, the transceiver can be communicatively coupled to the processor 110 and configured to interact with the processor 110, including to exchange computer-executable instructions and data.

The input-output (IO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets in the communication system 100.

The driver suite 150 can include an audio driver (not shown) and a video driver (not shown). The audio driver can include a sound card, a sound driver (not shown), an interactive voice response (IVR) unit, or any other device necessary to render a sound signal on a sound production device (not shown), such as for example, a speaker (not shown). The video driver can include a video card (not shown), a graphics driver (not shown), a video adaptor (not shown), or any other device necessary to render an image signal on a display device (not shown).

The screenshare creator 160 can be arranged to initiate and create a live share session, such as, for example, in response to receiving a live share request or instruction from a computing device 10. The screenshare creator 160 can be arranged to interact with one or more computing devices 10 to create the live share, including sending display and sound rendering instructions (and data) that, when executed by, for example, a browser on the computing devices 10 (shown in FIG. 1), causes the devices to process the data to render the screenshare, including live AV content feeds and any annotations, on the display screens and speakers of the participant computing devices 10. The screenshare creator 160 can communicate and interact with the annotation tracker 170. The screenshare creator 160 can be arranged to assemble live AV content feeds from each of the participating computing devices 10, as well as any annotations that might be applied during the live share. The live share content can be assembled and packetized based on, for example, an RTP (Real-Time Transport), UDP (User Datagram Protocol) or IP (Internet Protocol) protocol stack and sent to each participating computing device 10.

The screenshare creator 160 can include an annotation generator (annotator) tool 165. The annotator tool 165 can be arranged, in an embodiment, to create and apply annotations at the request or instruction of a participating computing device 10. For instance, the annotator tool 165 can be arranged to add or superimpose an annotation, or to apply a special effect, in real-time, to a live AV content feed, including for example, adding or applying a marking or overlay, or modifying a portion of the displayed AV content image.

The screenshare tracker 170 can be arranged to analyze and track each annotation as it is created or applied, in real-time, to the live AV content, including each annotated location in each frame of the underlying AV content feed (or the entire screenshare), and an annotation source identifier. The annotation source identifier can include, for example, the participant identifier UserID of the computing device 10 that annotated the AV content, or the computing device 10 (or 50, or 60, shown in FIG. 1) from which the AV content feed or annotation originated. The screenshare tracker 170 can include a participant tracker (P-tracker) 174 and an annotation tracker (A-tracker) 178.

The P-tracker 174 can include a computer resource asset arranged to identify and track the identity and actions of each participant during a live share session. The P-tracker 174 can be arranged to identify each participant based on, for example, the UserID, which can include, for example, a login identification (ID), a telephone number, an email address, an Internet Protocol (IP) address, a media access control (MAC) address, or any other unique identifier of the participant, or the computing device 10 used by the participant in the live share.

The A-tracker 178 can include a computer resource asset arranged to detect, identify and track each annotation as it is made during the live share, including the details of the annotation, the participant making the annotation, the time t, the location(s) AL of the annotation, and the location(s) VL of the underlying AV content.

The live share recorder 180 can be arranged to capture and store a screenshare. The live share recorder 180 can be arranged to capture and store AV content from any live AV content feed included in the screenshare, in real-time, as it occurs. The live share recorder 180 can be arranged to interact with the annotation tracker 170 and identify and store any annotations made in a screenshare. The live share recorder 180 can be arranged to analyze and generate AV content fingerprints of the annotations and AV content that is annotated. The live share recorder 180 can include a fingerprint unit 184. The live share recorder 180 can include an annotation encoder 188.

The fingerprint unit 184 can include, for example, a digital video fingerprinting algorithm (for example, a hashing algorithm or a perceptual hashing algorithm), an acoustic fingerprinting algorithm, a browser fingerprinting algorithm, or a machine fingerprinting algorithm.

The fingerprint unit 184 can include an ML platform, including an ML model, configured to analyze in real-time annotations as they are made and the underlying AV content and assign importance (learnable weights and biases) to aspects of the AV content, such that the underlying AV content can be detected and, for example, later identified and matched to the corresponding annotation, exactly as it was originally made to the underlying AV content to render the annotated AV content, in temporal and spatial synchronization of the annotation to the underlying AV content. The fingerprint unit 184 can be configured to output a prediction score that indicates a level of certainty that analyzed AV content matches annotated AV content. The ML model can be run by the processor 110 to predict the likelihood that AV content is annotated AV content and output a prediction score that indicates a likelihood of certainty of a match. The ML model can be run by the processor 110 predict a matching annotation for analyzed AV content, and to predict matching AV content prediction for a given annotation.

The ML platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing AV content. The machine learning platform(s) can include the ML model, which can search, analyze and detect or predict annotated AV content and match the corresponding annotation to the underlying AV content.

The annotation encoder 188 can include a computer resource asset arranged to detect and capture an annotation from any participant computing device in a live share session, as it occurs in real-time. The annotation encoder 188 can be configured to capture and store the annotation instructions and annotation data used to generate the annotation, including, for example, the computer-executable commands and annotation data such as, for example, time and screen locations of the annotations, such that the annotation can be reproduced, with respect to the annotated AV content, exactly as it appeared when the annotation was made to the underlying AV content, in temporal and spatial synchronization. The annotation encoder 188 can assemble the annotation instructions and annotation data in an annotation rendering file, which can be stored locally in the memory (not shown) in the processor 110, or in the memory 120.

In an embodiment, the annotation encoder 188 can be configured to generate a timestamp for each frame of the annotated AV content and embed the timestamp in the annotation data and/or the underlying AV content. The annotation encoder 188 can be configured to generate the screen location of the annotation and embed the location information in the annotation data and/or AV content.

In an example, the annotation encoder 188 can be arranged to encode each pixel location, frame, and time of the annotation as it appeared on the annotated AV content in the original live share. The annotation encoder 188 can be arranged to encode display rendering instructions and data necessary to generate the annotation exactly as it appeared in the original live share. For instance, if a participant on a computing device draws a red 2-point circle (for example, 2pt in CSS) around an object in a live AV content feed using a stylus (shown in FIG. 1), the annotation encoder 188 can capture and encode the computer-executable commands and data necessary to reproduce that same exact circle at the same location on the AV content.

In an embodiment, the annotation encoder 188 can be arranged to generate code words for an annotation, wherein the code words can be used to reproduce the annotation exactly as it appeared during a live share. The code words can include, for example, the time, frame, location, and rendering commands necessary to render the annotation exactly as it appeared during the original live share. A code word can include an element of standardized computer code or protocol assigned a unique meaning. In a nonlimiting embodiment, a code word can include a unique command that, when executed by the processor 110 (or computing device 10), causes the processor to render a display pixel or reproduce a sound according to a predetermined rule, including, for example, color, brightness, frequency, amplitude, timbre, velocity, wavelength or phase.

The live share recorder 180 can be arranged to store the annotations in memory 120, for example, as one or more annotation rendering files. In an embodiment, the live share recorder 180 can be arranged to store the live screenshare AV content, including any one or more of the live AV content feeds in the live share, in the memory 120. The memory 120 can include a relational database, or an index that maps the stored AV content and associated annotations, in temporal and spatial synchronization. The live share recorder 180 can be arranged to generate the index in real-time during the live share as annotations occur. The index can include timestamp information for one or more of the image (or sound) frames of the annotated AV content.

In an embodiment, the live share recorder 180 can be arranged to store the live AV content with annotations embedded in the AV content. In an embodiment, the annotation code words can be stored separate from the AV content and indexed to the stored AV content, or AV content received by the communication system 100. The code words can include, for example, time and location data for each frame of annotated AV content.

The live share player 190 can be arranged to reproduce (or playback) stored annotations, with or without the corresponding AV content. The live share player 190 can include a content match unit 194. The live share player 190 can be configured to receive a request from a participant computing device 10 and send annotation rendering instructions and annotation data that can be processed by one or more computing devices 10 to render an annotation exactly as it appeared when it was made, in real-time, to the live AV content in the original live share experience.

In an embodiment, the live share player 190 can be combined with the live share recorder 180.

The live share player 190 can be arranged to retrieve an annotation (for example, an annotation rendering file from memory 120) and send annotation rendering instructions and annotation data (or the annotation rendering file) to a computing device 10 (shown in FIG. 1) to render the annotation on the corresponding AV content exactly as in the original live share. The AV content and corresponding annotation rendering file can be accessed and reproduced by the computing device 10.

The content match unit 194 can be configured to analyze AV content and determine whether the AV content matches previously annotated AV content. The content match unit 194 can be configured to compare the AV content against previously annotated AV content and determine when a match is detected. The content match unit 194 can be configured to generate digital fingerprints of AV content (for example, generating a video hash or an audio hash via a hash function) on-the-fly and compare the generated fingerprints to one or more stored AV content fingerprints, which, for example, can be retrieved from an annotation rendering file for an annotation. The control match unit 194 can be configured to, based on the results of the comparison, identify an annotation and the underlying AV content to which the annotation was previously made, exactly as in the original live share, in temporal and spatial synchronization.

In an embodiment, the content match unit 194 can be combined with the fingerprint unit 184.

The content match unit 194 can include the same fingerprinting algorithm included in the fingerprint unit 184. The content match unit 194 can be configured to analyze AV content and generate an AV content fingerprint, which can then be compared, by the content match unit 194, to a stored AV content fingerprint for a previously made annotation.

The content match unit 194 can include an ML platform, including a trained ML model, configured to analyze AV content and predict the likelihood that the analyzed AV content matches AV content that was previously annotated. The ML model can be trained to also identify the annotation that was made to that AV content, exactly as in the original live share, in temporal and spatial synchronization.

In an embodiment, the communication system can be arranged to allow a participant, during a live share, to annotate the screenshare (or a live AV content feed included in the screenshare) and record the annotations as they occur in real-time, without taking screenshots or using an external device. For example, a live share participant can, at a first computing device 10 (shown in FIG. 1), observe a live AV content feed originating from a second computing device 10 (or the computer resource assets 50 or 60, shown in FIG. 1) and annotate the AV content in real-time, such that the annotations applied to the AV content are visible on the computing devices 10 of all participants in the live share, and reproducible with respect to that AV content exactly as it appeared when the annotation was originally made, in temporal and spatial synchronization. The communication system can be arranged to encode the annotations and embed the annotation into the AV content and store the embedded AV content, or, alternatively, to generate an annotation rendering file and store the annotations without AV content, such that, for example, when the AV content is played back (or reproduced), the annotations appear exactly as they had during the original live share experience—for example, lines drawn on the live AV content feed by a participant during a live share appear exactly as they were drawn when the AV content is played back. The annotation pixels can be stored and encoded into the AV content for future playback.

In various embodiments, the communication system 100 can include one or more controllers (not shown), including a high-speed controller that can manage bandwidth-intensive operations for the communication system 100, and a low-speed controller that can manage lower bandwidth-intensive operations. Such allocation of functions is exemplary only. In one implementation, the high-speed controller is coupled to a portion of the memory 120, the display screen (for example, through a graphics processor or accelerator), and to high-speed expansion ports (not shown), which can be arranged to accept various expansion cards (not shown). In the implementation, the low-speed controller is coupled to another portion of the memory 120 and one or more low-speed expansion ports (not shown). The low-speed expansion ports, which can include various communication ports (for example, USB) can be coupled to one or more input/output devices (not shown), such as a keyboard, a pointing device, a scanner, or a networking device such as a switch or router, for example, through a network adapter.

The communication system 100 can be implemented in a number of different forms, such as, for example, seen in FIGS. 1 and 2. In an embodiment, the communication system 100 can be implemented as a server 30 (shown in FIG. 1), or multiple times in a group of such servers. It can be implemented as part of a rack server system. In addition, it can be implemented in a personal computer such as a laptop computer. Alternatively, computing resource assets from the communication system 100 can be combined with other computing resource assets in any of the computing devices 10. Each of such computing resource assets can contain one or more of the devices, and an entire system may be made up of multiple devices communicating with each other through communication links.

Referring to FIGS. 1 and 2, the communication system 100 can be arranged to communicate, for example, via the network 20, and to feed live AV content (such as, for example, the AV-1, AV-2, AV-3, AV-4, AV-5 content) to the computing devices 10 participating in a live share, each of which can be configured to display, for example, a live share board. Using the user interface on the computing device 10, a participant can annotate AV content in one or more live AV content feeds, which can be recorded in real-time by the communication system 100, as the annotations are made to the underlying AV content during the live share.

The computing device 10 can reproduce live AV content feeds on its display device (shown in FIG. 1), including any annotations that that might be made on or to the live AV content. For instance, the computing device 10 can display live AV content (shown in FIG. 1) and annotations as they are applied in real-time to the AV content, for example, by the participant using the stylus (shown in FIG. 1). The live share (including the live AV content and annotations) can be stored and executed in the computing device 10, or stored and/or executed elsewhere in the environment 1, such as, for example, in the communication system 100.

In a nonlimiting embodiment, the annotations can include markup language annotations for identifying content and creating structured documents, including images, text, links, sounds, and other objects. The markup language annotations can include a plurality of tags for displaying AV content and annotations on the display screens of one or more of the computing devices 10 participating in the live share. The markup language can include, for example, Standard Generalized Markup Language (SGML), Scalable Vector Graphics (SVG), HTML, Extensible Markup Language (XHTML or XML), XML User Interface Language (XUL), or LaTeX. The markup language annotations can be provided as a markup language file that can be executed by, for example, a web browser running in the computing device 10 to render the annotations on the computing device 10.

The annotations can include style sheet language annotations for providing rules for stylistics and for describing the presentation of the content and document with the markup language annotations, such as, for example, the markup language file. The style sheet language annotations can include, for example, colors, fonts, layouts, and other stylistic properties. The style sheet language can include, for example, CSS, Document Style Semantics and Specification Language (DSSSL), or Extensible Stylesheet Language (XSL). The style sheet language annotations can be provided as a style sheet language file. Alternatively, the style sheet language annotations can be incorporated into the file containing the markup language annotations.

The annotations can include scripting language instructions to create interactive effects related to the markup language annotations or style sheet language annotations. The scripting language can include, for example, Bash (for example, for Unix operating systems), ECMAScript (or JavaScript) (for example, for web browsers), Visual Basic (for example, for Microsoft applications), Lua, or Python. The scripting language instructions can include instructions that when executed by, for example, the web browser on the computing device 10 effect display or reproduction of AV content. The scripting language instructions can be provided as a scripting language file. Alternatively, the scripting language instructions can be incorporated into the file containing the markup language annotations.

The annotations can include a document object model (DOM) such as for HTML or XML (for example, DOM5 HTML) that can create object-oriented representations of the content or documents that can be modified with the scripting language instructions. A DOM includes a cross-platform and language-independent convention for representing and interacting with objects in HTML, XHTML/XML, SGML, SVG, or XUL. As used herein, a document can refer to the DOM's underlying document.

The annotations can be configured to be executable by the computing device 10 (shown in FIG. 1), or the processor 100 (shown in FIG. 2), and can follow a model-view-controller (MVC) design pattern for user interfaces. According to the MVC design pattern, an annotation can be divided into three areas of responsibility, including: (1) the Model, which includes the domain objects or data structures that represent the application's state; (2) the View, which observes the state and generates an output to the users; and, (3) the Controller, which translates user input into operations on the model.

The communication system 100 can be arranged to receive a live AV content feed from the computer resource assets 50, 60, and each computing device 10 participating in a live share and to provide any or all live AV content feeds to each participating computing device 10. The live AV content feeds can be received from the communication system 100 by each participating computing device 10 and displayed on a display screen and/or reproduced on a speaker device. In this nonlimiting example, the live AV content can include, for example, a display container for each live AV content feed, as seen in the nonlimiting example depicted in FIG. 1. The live share, including live AV content feed(s) and any annotations, can be reproduced by each participating computing device by means of, for example, a browser application running on the computing device 10. The browser application can, when executed by the computing device 10, convert, for example, HyperText Markup Language (HTML), Cascading Style Sheets and JavaScript into a working website, webpage or live share display that can be interacted with by an operator of the computing device 10, such as, for example, through a user interface. The live share can include, in addition to the live AV content and associated annotations, a participant identifier for each live AV audio content feed and annotation.

Figure 3:
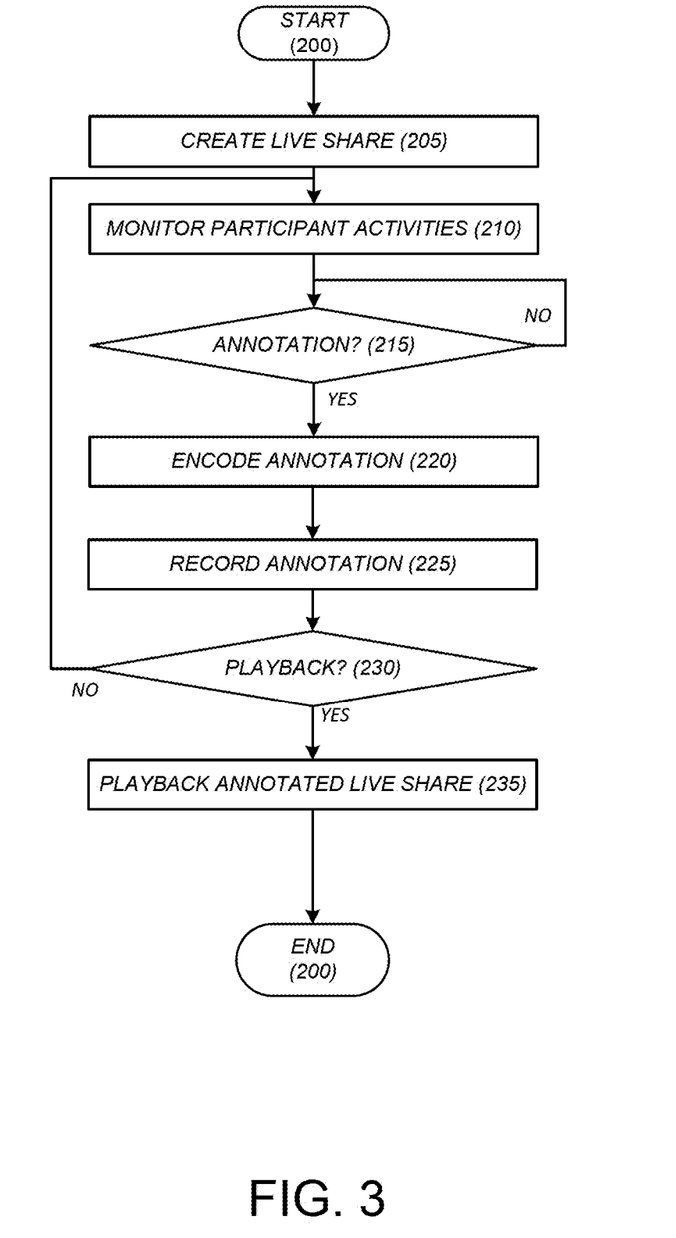
FIG. 3 depicts a nonlimiting embodiment of a computer-implemented method, according to the principles of the disclosure.

FIG. 3 shows an embodiment of a live share annotation process 200 that can be performed by the communication system 100 (shown in FIG. 1 or 2). In an embodiment, the process 200 can be carried out by the processor 110 (shown in FIG. 2). The memory 120 (shown in FIG. 2) can include a non-transitory computer-readable medium containing computer program instructions or executable code that, when executed by the processor 110, can cause the communication system 100 to perform each of the steps 210 to 235 (shown in FIG. 3).

Referring to FIGS. 1-3 contemporaneously, a live share can be initiated or created by the live share creator 160 in response to a request or instruction from a computing device 10, or sua sponte, such as, for example, at a scheduled time (Step 205).

In initiating or creating the live share (Step 205), one or more live AV content feeds can be received by the communication system 100 from at least one computing devices 10 participating in the live share ("participant computing devices") and combined in a screenshare in the case of two or more participant computing devices. The live share can be hosted by the communication system 100, with each of the live AV content feeds provided on a live share board in the screenshare. The screenshare can include, for example, a background screen with alterable containers, each configured to render a live AV content feed from a unique participant computing device 10, or the computer resource assets 50 or 60.

In various embodiments, the screenshare can include, for example, a main screen similar to that of state-of-the art videoconference systems, except that the main screen can be configured to be rendered (or displayed) as near-infinite in width, height, or depth, such as, for example, limited only by the capabilities of the computer resource asset(s) in the communication system 100, and that all, or a portion of all, AV content can be annotatable in real-time.

The communication system 100 can be configured to allow a participant to manipulate any element or article in the screenshare, such as, for example, to move an element or article anywhere on the screenshare, flip, turn, spin or otherwise alter a shape, size, or appearance of the element or article on the screenshare. The communication system 100 (for example, A-tracker 178, shown in FIG. 2) can be configured to include customizable settings for each participant such that, for example, attributes of the screenshare can be rendered differently by one or more of the participating computing devices—for example, a participant may be see text on an element in French, while a participant in the U.S.A. will see the same element with text in English.

In an embodiment, the communication system 100 can include real-time visual translation, including a speech-to-text functionality. The communication system 100 be configured to translate text or audio, such as, for example, where spoken words are recognized, and present the text or audio visually in a subtitle format, or as audio in the same or a different language. The audio or video recognition and translation can be performed by machine learning. This capability allows for written content to be recognized, translated and presented visually in place of the original content, allowing users to see the content in their own language. While spoken words are translated and presented back, any shared written content can remain in the originator's language. Notes, stickies, bullet points, and other displayable articles or objects can be presented in the originator language or translated at the computing device 10 based on the device's or the participant's settings. The communication system 100 can be configured to translate created and existing content in real-time as it presents the screenshare to the participant computing devices.

In an embodiment, the communication system 100 can include Optical Character Recognition (OCR) technology, which can, in real-time, recognize, translate and replace text on the screenshare in a collaborative and interactive manner. The communication system 100 can be configured to allow each participant to see written content in the participant's own language, in real-time. For uneditable documents, the communication system 100 can be configured to apply OCR to emerging content (images) and then translate into a target language.

In an embodiment, the main screen of the screenshare can be arranged such that, when the screenshare is rendered on a participant computing device 10, the participant can (for example, using a mouse) move up, down, and sideways, or into or away from any point on the live share board, providing the participant with an experience of an infinitely wide, high and deep screenshare—for example, much like a person standing on the earth and being able to move in any direction with respect to the earth's surface, including, for example, forward, sideways, up, or down.

The live share creator 160 can be arranged to aggregate the live AV content feed from each participant computing device 10 in the screenshare, including any annotations made in real-time, and feed screenshare to each participant computing device 10.

As the live share proceeds in real-time, activities of each participant can be monitored in real-time, for example, by the P-tracker 178 (Step 210). At the same time, any annotations made by a participant can be detected (Step 215) and the annotations or annotated AV content fingerprinted, on-the-fly, by the annotation encoder 188 when an annotation occurs.

The activities of each participant computing device 10 can be monitored and tracked by the P-tracker 174. The activities of each participant can be monitored for occurrence of an annotation in real-time (Step 215). If the A-tracker 178 detects or determines an annotation (YES at Step 215), then the annotation can be encoded by the annotation encoder 188 in real-time (Step 220). As part of encoding the annotation, the annotation encoder 188 can generate an AV content fingerprint (for example, video hash or audio hash) of the annotated AV content and encode the AV content fingerprint (Step 220). The annotation encoder 188 can be configured to encode all of the particulars of the annotation, including annotation rendering instructions and annotation data, including, for example, time, frame, screen (pixel) location, pixel color, pixel brightness, frequency, amplitude, timbre, velocity, wavelength, phase or any other visual or auditory characteristic reproducible by the computing devices 10. In a nonlimiting embodiment, the annotation can be encoded as one or more code words.

Each encoded annotation can be stored by the live share recorder 180, for example, as an annotation rendering file (Step 225). In an embodiment, the encoded annotations are stored, by the live share recorder 180, in the memory 120. The underlying (or annotated) AV content can be stored in the memory 120, separate from the annotation, for example, as the underlying AV content, AV content fingerprints, or annotated AV content. The live share recorder 180 can be configured to generate and store an annotation index that can map each stored annotation to the underlying AV content, in temporal and spatial synchronization, such that the annotation can be rendered (or, in the case of sound, reproduced) exactly as in the original live share experience.

In embodiments comprising HTML5, the computer system 100 can be configured to provide, for example, an audio tag (e.g., an instruction to embed an audio file/link in the displayed screen and how to play it), a video tag (e.g., an instruction to embed video in the displayed screen and how to play it), a source tag (e.g., can be used with audio or video to identify a source for the audio or video), an embed tag (e.g., an instruction to embed specified media type for content that might lack support within other media elements), a canvas tag (e.g., an instruction to set aside part of the display screen), and an svg tag (e.g., an instruction to embed vector graphics (e.g., object, text, overlay and/or background) encoded with SVG markup language, to allow graphics (e.g., objects, text, overlay and/or background) to be scaled dynamically to the area and shape of the display screen without losing any graphic quality). As understood by those skilled in the art, the encoded annotations can include other tags that, when referenced by, for example, a style sheet language, cause the communicating device 10 to render the live share AV content (including each annotation) to have a location, layout, size, shape, color, texture, font, special effect, backdrop, or any other visual or auditory characteristic such that the played back live share AV content matches the original live share experience, including all annotations exactly as they originally appeared.

The encoded annotation can include computer instructions and data necessary to reproduce the annotation exactly as it appeared, for example, on the screenshare, in the original live share experience. The live share player 190 can be configured to package and send annotation rendering instructions and annotation data such that each annotation can be rendered or reproduced, for example, by a computing device 10, with the AV content exactly as in the original live share. The live share player 190 can be configured to provide all rendering instructions and data necessary for rendering the annotations in temporal and spatial synchronization with the annotated AV content.

During the live share, or at any point afterwards, any annotation (or annotated AV content) can be played back by a computing device 10 based on annotation rendering instructions and annotation data provided by the screenshare player 190, exactly as in the original live share experience (YES at Step 230, then Step 235). For instance, a playback request may be received from a computing device 10 for a particular portion of AV content or screenshare (YES at Step 230), and, in response, the live share player 190 can retrieve and provide the annotation rendering instructions and annotation data corresponding to the AV content (or screenshare) (Step 235).

The terms "a," "an," and "the," as used in this disclosure, mean "one or more," unless expressly specified otherwise.

The terms "annotate," "annotating," "annotated," and variations thereof, as used in this disclosure, mean to draw on, mark up, alter or manipulate live AV content as it appears or, in the case of audio content, is reproduced in real-time on one or more computing devices during live share of AV content between two or more computing devices.

The term "annotation," as used in this disclosure, means a line, a circle, an object, an article, a drawing, a mark, a special effect, or anything else that can be applied, superimposed, added or incorporated into live AV content in real-time during a live share.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 302.11, DECT, 0G, 1G, 2G, 3G, 4G, 5G, or 6G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (C), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 302.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission," "transmit," "sent" or "send," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

What is claimed is:

1. A communication system for initiating and supplying a live share containing live audio-video content from one or more communicating devices, the system comprising:
    a receiver configured to receive a live audio-video content feed from a communicating device;
    a hardware processor communicatively coupled to the receiver, the processor being configured to:
        initiate, by a live share creator and in response to an instruction signal from a participant computing device, a live share session that includes the live audio-video content feed from the communicating device in real-time;
        annotate, by a live share recorder and in response to an annotation instruction signal received from the participant computing device or another participant computing device, audio-video content in the live audio-video content feed to generate an annotation and annotated audio-video content in real-time during the live share session; and
        store, by the live share recorder, the annotation in a memory as a stored annotation; and
    a transmitter communicatively coupled to the processor, the transmitter being configured to send the annotated audio-video content to at least one of the participant computing device and said another participant computing device to render a live share comprising the live audio-video content feed, including the annotated audio-video content,
    wherein the annotation is generated in temporal and spatial synchronization with the annotated audio-video content in the live share session, and
    wherein the stored annotation is renderable in temporal and spatial synchronization exactly as it appeared during the live share session for a portion of the audio-video content requested after the live share session.

2. The communication system in claim 1, further comprising:
    a fingerprint unit configured to generate a digital fingerprint of the audio-video content.

3. The communication system in claim 2, further comprising:
    an annotation encoder configured to encode the audio-video content with the digital fingerprint to generate the annotated audio-video content.

4. The communication system in claim 1, further comprising:
    a live share player configured to generate live share display rendering instructions and live share display rendering data for the live share rendered by said at least one of the participant computing device and said another participant computing device, the live share comprising the live audio-video content feed and the annotated audio-video content.

5. The communication system in claim 4, wherein the live share player comprises a content match unit, the content match unit being configured to:
    analyze audio-video content and compare the analyzed audio-video content to annotated audio-video content; and determine when the analyzed audio-video content matches the annotated audio-video content.

6. The communication system in claim 5, wherein the live share player is configured to:
retrieve the annotation from memory that corresponds in temporal and spatial synchronization to the matching audio-video content; and
apply the retrieved annotation to the matching audio-video content.

7. The communication system in claim 5, wherein the content match unit is configured to:
analyze audio-video content by generating a digital fingerprint of the audio-video content; and
compare the analyzed audio-video content to annotated audio-video content by comparing the digital fingerprint to a digital fingerprint of the annotated audio-video content.

8. A computer-implemented method for initiating and supplying a live share containing live audio-video content from one or more computer resource assets, the method comprising:
receiving a live audio-video content feed from a computer resource asset;
initiating, by a live share creator and in response to an instruction signal from a participant computing device, a live share session that includes the live audio-video content feed from the computer resource asset in real-time;
annotating, by a live share recorder and in response to an annotation instruction signal received from the participant computing device or another participant computing device, audio-video content in the live audio-video content feed to generate an annotation and annotated audio-video content in real-time during the live share session;
storing, by a memory, the annotation; and
transmitting the annotated audio-video content to at least one of the participant computing device and said another participant computing device to render a live share comprising the live audio-video content feed, including the annotated audio-video content,
wherein the annotation is generated in temporal and spatial synchronization with the annotated audio-video content in the live share session, and
wherein the stored annotation is renderable in temporal and spatial synchronization exactly as it appeared during the live share session for a portion of the audio-video content requested after the live share session.

9. The computer-implemented method in claim 8, further comprising:
generating, by a fingerprint unit, a digital fingerprint of the audio-video content.

10. The computer-implemented method in claim 9, further comprising:
encoding the audio-video content with the digital fingerprint to generate the annotated audio-video content.

11. The computer-implemented method in claim 8, further comprising:
generating live share display rendering instructions and live share display rendering data for the live share rendered by said at least one of the participant computing device and said another participant computing device, the live share comprising the live audio-video content feed and the annotated audio-video content.

12. The computer-implemented method in claim 11, further comprising:
analyzing audio-video content;
comparing the analyzed audio-video content to annotated audio-video content; and
determining when the analyzed audio-video content matches the annotated audio-video content.

13. The computer-implemented method in claim 12, further comprising:
retrieving the annotation from memory that corresponds in temporal and spatial synchronization to the matching audio-video content; and
applying the retrieved annotation to the matching audio-video content.

14. The computer-implemented method in claim 12, wherein:
the analyzing the audio-video content includes generating a digital fingerprint of the audio-video content; and
the comparing the analyzed audio-video content to annotated audio-video content includes comparing the digital fingerprint to a digital fingerprint of the annotated audio-video content.

15. A non-transitory computer-readable medium for initiating and supplying a live share containing live audio-video content from one or more computer resource assets, the computer-readable medium comprising instructions that, when executed by a processor, cause the processor to perform a method comprising:
receiving a live audio-video content feed from a computer resource asset;
initiating, by a live share creator and in response to an instruction signal from a participant computing device, a live share session that includes the live audio-video content feed from the computer resource asset in real-time;
annotating, by a live share recorder and in response to an annotation instruction signal received from the participant computing device or another participant computing device, audio-video content in the live audio-video content feed to generate an annotation and annotated audio-video content in real-time during the live share session;
storing, by a memory, the annotation; and
transmitting the annotated audio-video content to at least one of the participant computing device and said another participant computing device to render a live share comprising the live audio-video content feed, including the annotated audio-video content,
wherein the annotation is generated in temporal and spatial synchronization with the annotated audio-video content in the live share session, and
wherein the stored annotation is renderable in temporal and spatial synchronization exactly as it appeared during the live share session for a portion of the audio-video content requested after the live share session.

16. The non-transitory computer-readable medium in claim 15, the method further comprising:
generating, by a fingerprint unit, a digital fingerprint of the audio-video content.

17. The non-transitory computer-readable medium in claim 16, the method comprising:
encoding the audio-video content with the digital fingerprint to generate the annotated audio-video content.

18. The non-transitory computer-readable medium in claim 15, the method comprising:
generating live share display rendering instructions and live share display rendering data for the live share rendered by said at least one of the participant computing device and said another participant computing device, the live share comprising the live audio-video content feed and the annotated audio-video content.

19. The non-transitory computer-readable medium in claim 18, the method comprising:
    analyzing audio-video content;
    comparing the analyzed audio-video content to annotated audio-video content; and
    determining when the analyzed audio-video content matches the annotated audio-video content.

20. The non-transitory computer-readable medium in claim 19, the method comprising:
    retrieving the annotation from memory that corresponds in temporal and spatial synchronization to the matching audio-video content; and
    applying the retrieved annotation to the matching audio-video content.

* * * * *